INVENTOR.
ERIC J. STEINLEIN
BY
Alexander & Dowell
ATTORNEYS

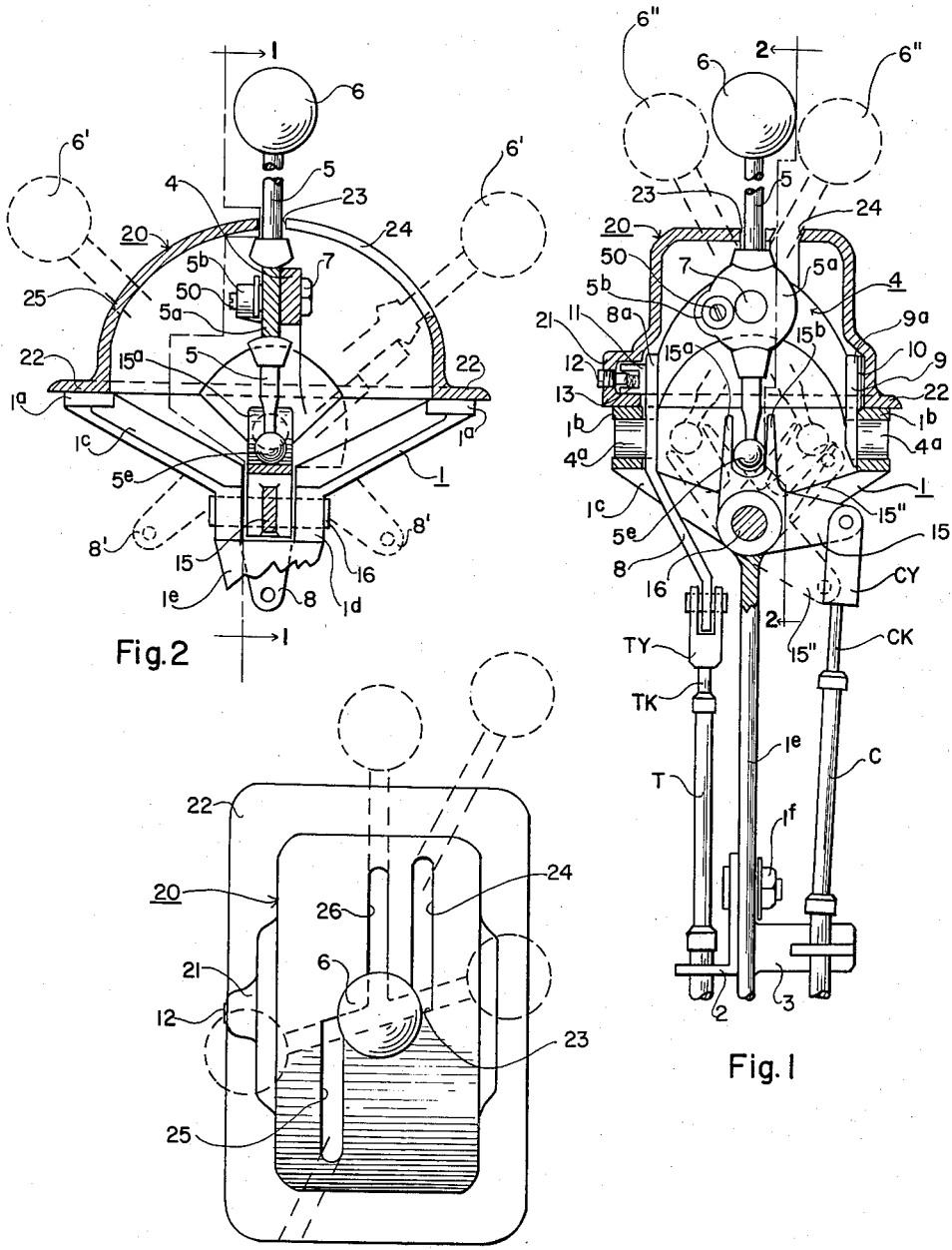
Jan. 10, 1961 — E. J. STEINLEIN — 2,967,436
THROTTLE AND CLUTCH CONTROL HEAD
Filed March 4, 1959 — 2 Sheets-Sheet 1
INVENTOR.
ERIC J. STEINLEIN
BY
Alexander & Dowell
ATTORNEYS Jan. 10, 1961     E. J. STEINLEIN     2,967,436
THROTTLE AND CLUTCH CONTROL HEAD Filed March 4, 1959     2 Sheets-Sheet 2

United States Patent Office 2,967,436
Patented Jan. 10, 1961

2,967,436

THROTTLE AND CLUTCH CONTROL HEAD

Eric J. Steinlein, Galesville, Md.

Filed Mar. 4, 1959, Ser. No. 797,103

19 Claims. (Cl. 74—471)

This invention relates to control heads for operating the transmission and throttle of an engine, for example in marine installations, by the operation of a single lever which can be moved in four directions to effect related control of the throttle and transmission.

It is a primary object of this invention to provide an improved control head wherein the motion of the control lever is limited to a safe sequence of positions from full speed ahead, through idling speed and neutral transmission position, to full speed astern, detent means being provided for the purpose of locating the neutral transmission position, and adjustable drag means being provided for maintaining the lever at a selected setting.

In the preferred embodiment of the invention, idle throttle and neutral clutch are both located in a straight up-and-down position of the lever. A slotted guide cover protects the mechanism within the control head and the slots provide sequential guidance of the lever which extends outwardly through the slots to a handle located at the outer end of the lever.

The guide cover in the preferred embodiment of the invention includes a crosswise slot across the longitudinal center of the cover and two longitudinal slots intersecting the outer ends of the crosswise slot and extending respectively in opposite directions therefrom, the control lever placing the engine transmission in neutral when in the center of the crosswise slot, placing the transmission in forward when the lever is moved transversely to one end of the crosswise slot, and placing the transmission in reverse when the lever is moved transversely of the head to the other end of the slot. When the lever is at either end of the crosswise slot and the transmission engaged, the throttle is then advanced by moving the lever away from the crosswise slot in the communicating longitudinal slot. It is therefore apparent that the transmission must be engaged before the control lever can be moved very far from the neutral position, this feature providing important protection against accidental damaging of the engine.

It is another important object of my invention to provide an auxiliary longitudinal slot extending from the center of the crosswise slot in which lever position the transmission is in neutral, this slot permitting the throttle to be advanced without the transmission being engaged, for instance for use when charging batteries or warming up a cold engine.

It is a further object of my invention to provide a lock means to block the entrance to the auxiliary longitudinal slot from the crosswise slot in order to prevent accidental entry of the lever into the auxiliary slot during rapid manipulation of the engine and at an instant when the operator intends that the lever be entered into the forward throttle control slot.

It is another important feature of this invention that the crosswise slot be disposed somewhat diagonally as it extends across the longitudinal center of the slotted cover so that the lever is in its lowest idle position when the transmission is in neutral, but so that the throttle is advanced slightly from this lowest position whenever the lever is moved in the crosswise slot in a direction intended to engage the transmission, this feature reducing the likelihood of stalling the engine.

According to a modification of the present invention, the transverse slot is enlarged somewhat in the vicinity of each longitudinal slot so that a certain amount of control over the throttle setting can be had within the crosswise slot so that the operator is not always limited to precisely idling speed when moving the lever in a direction to engage the transmission. In this modification, adjustable stop means are provided in the slotted cover and screwed thereto, said stop means being positionable thereon so as to widen or narrow the crosswise slot in a direction longitudinal of the head to adjust the amount of lever throw which can be had in a longitudinal direction while the lever is within the crosswise slot.

It is another object of the invention to provide in a head, having a diagonal crosswise slot, several pockets located opposite the intersection of each longitudinal slot with the crosswise slot, said pockets extending back beyond each intersection so that the throttle can be fully retarded while the transmission is still engaged to provide a setting in which dead-slow forward or dead-slow reverse can be obtained.

It is a further important object of the invention to provide a head which can easily be adapted for use either with push-pull type control means, or with tension-cable type control means in which one cable is pulled in while the other cable is payed out in equal amounts. In connection with tension-cable control means, sheave segments are employed which segments are shaped such that constant cable tension is maintained regardless of the position of the segments, and these segments are also shaped to provide substantially linear increase in engine speed for equal changes in position of the control lever handle.

It is still another object of the invention to provide a control head in which arms extend downwardly below the head for attachment to the control operator means, and in which these arms can be reversibly positioned with respect to their pivots in such a manner that the head can be easily and conveniently adapted for left-hand or right-hand assembly as may be required in a particular installation.

Other objects and advantages of the present invention will become apparent during the following discussion of the drawings wherein:

Fig. 1 is an elevation view of a control partly in section taken along line 1—1 of Fig. 2;

Fig. 2 is a transverse section view taken along line 2—2 of Fig. 1;

Fig. 3 is a plan view of the control showing the lever in neutral position and showing in dashed lines various alternate positions of the control lever;

Figure 6:
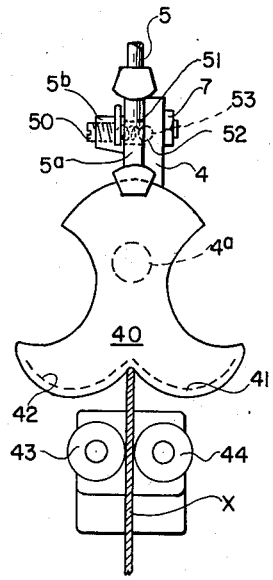
Fig. 6 is an elevation view of another modified form of the control showing operator means intended for use with a tension-cable control system.

Referring now to the drawing, the preferred embodiment of the control shown in Figs. 1, 2 and 3 includes a frame 1 having a mounting flange 1a and having opposed journal bearings 1b. The flange 1a and bearings 1b are supported on a spider 1c which includes a boss 1d and a downwardly extending support 1e. The support 1e carries at its lower end brackets 2 and 3 which are attached by bolt means 1f to the support 1e, the bracket 2 serving as a mounting for a throttle control cable T and the bracket 3 serving as a support for the transmission control cable C. These two cables comprise standard control means which are available from a number of manufacturers and each of which has a sliding core labeled, respectively, TK and CK. At the top of each of the cables is a yoke TY and CY, respectively, which yokes attach in a manner which is well known per se to control arms carried by the head.

Within the frame 1 there is located a bearing block 4 which comprises an arched member having trunnions 4a at each end which are journaled in bearings 1b so that the arched member of the bearing block 4 can be rocked back and forth longitudinally of the frame about the trunnions 4a which are mutually aligned along a transverse axis. The control lever 5 carries at its outer end a handle 6 and the lever extends inwardly to a boss 5a which is pivotally connected to the arched portion of bearing block 4 by a transverse pin 7. The lever is free to pivot about the axis of the pin 7 so that the handle can be moved transversely of the frame. A small detent boss 5b is carried by the boss 5a and adjustable detent means is located in this boss so as to provide an indication of the transverse position of the handle 6, this detent means being more fully described in connection with Fig. 6.

A first control arm 8 extends downwardly from the bearing block 4 and is secured thereto in any suitable manner so that when the bearing block 4 is rocked by longitudinal motion of the handle 6, the first arm 8 is rocked from a central position shown in full lines in Fig. 2 to one of the dotted positions shown at 8' in this figure. It will be noted that the handle 6 in each of the dotted positions occupies a position marked 6'. The lower end of the first arm 8 is connected with the yoke TY of the throttle control cable T in such a manner that the core TK of the cable is pushed to its lowest position when the handle 6 is straight up and down and so that the core TK is pulled further out of the cable T when the handle is moved to either of the positions labeled 6' in Fig. 2. Thus, idle position of the cable core TK in the embodiment illustrated in Figs. 1, 2 and 3 is obtained when the handle 6 is in the center, and the core TK is pulled farther out of the cable whenever the handle is moved from the center position 6 toward a dotted position 6'.

On the other side of the bearing block 4 from the first arm 8 is a spacer 9 which is interchangeable with the arm 8 so that the arm can be located on the right side of the control head, Fig. 1, instead of on the left side as shown.

The upper end 8a of the arm 8 and the upper end 9a of the spacer 9 each include a surface which can be used as a drag surface. A friction plate 10 is provided adjacent the upper surface of the spacer 9 and a spring-loaded drag assembly is provided adjacent the upper surface of the first arm 8. This drag assembly comprises a drag shoe 11, a spring 13, and a screw 12 to urge a spring 13 inwardly in order to apply pressure on the shoe 11 against the surface of the arm in the vicinity of its upper end 8a. This screw 12 is threaded into a boss 21 which is formed on the side of the cover 20 adjacent a flange 22 around its lower periphery to rest on the flange 1a of the frame 1. The boss 21 can also be seen in Fig. 3. It is within the scope of this invention to provide two bosses, one on each side, for the purpose of providing an adjustable drag on either side or two friction drag adjustments in the event that greater friction is necessary in a particular system.

The cover 20 can take the shape of a dome or of a semi-cylinder having a plurality of guide slots all of which are mutually intersecting and which serve to guide the lever 5 into various sequential positions. These slots comprise a crosswise slot 23 which joins at its ends longitudinal slots 24 and 25. Also, a central slot 26 can be provided which serves as an auxiliary guide slot for the purpose hereinafter described.

The lever 5e terminates in a ball 50 which is formed at the operator end of the lever. This ball 5e is confined between two plates 15a and 15b of a forked second arm 15, this arm connecting with the yoke CY of the transmission control cable C, and the arm being pivotally supported between the yoke CY and the forked end at a pin 16. Thus, when the lever 5 is rocked back and forth by the handle 6 from the central position to either of the positions marked 6'', Fig. 1, the arm 15 is rotated by the ball 5e around the pin 16 so as to raise or lower the core CK. When the handle 6 is moved to the right in Fig. 1 the arm 15 moves to the upper position marked 15'' and when the handle 6 is moved to the left position 6'' the arm 15 is moved to the lower position marked 15'''. Therefore it can be seen that three positions of the clutch control can be had by motion of the handle 6 in a transverse direction, and these positions represent forward, neutral and reverse.

Figure 4:
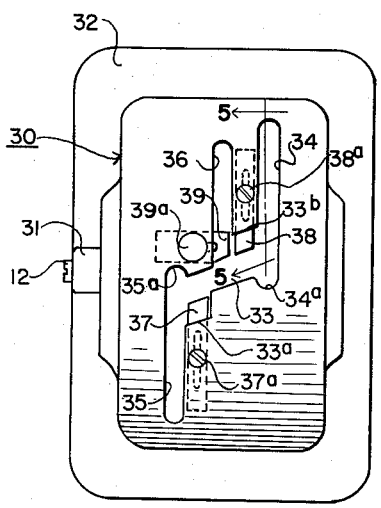
Fig. 4 is a plan view of a modified form of the control.
Figure 5:
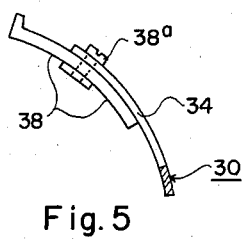
Fig. 5 is a section view taken along line 5—5 of Fig. 4.

Fig. 4 shows a modification in which an arched guide cover 30 is provided with a boss 31 corresponding with the boss 21, a flange 32 corresponding with the flange 22 and a plurality of slots including a crosswise slot 33, a longitudinal slot 34, another longitudinal slot 35, an auxiliary slot 36, all rather similar to the slots shown in Fig. 3. However, the crosswise slot 33 is longitudinally enlarged at 33a and at 33b and the adjustable stops 37 and 38 are provided which are respectively secured to the cover by screws 37a and 38a so that the stops 37 and 38 can be longitudinally adjusted with respect to the main portion of the crosswise slot 33 to adjust its area in the vicinity of its ends.

An additional lockout tab 39 is provided to close the entrance to the auxiliary fast-idle slot 36, and this lockout tab 39 can be moved in and out of the slot by means of a thumb screw 39a so that the auxiliary slot can be opened or blocked by the tab 39 as desired. In addition, pockets 34a and 35a are provided so as to permit the throttle to be reduced to dead-slow speed without disengaging the transmission. Since the crosswise slot 33 is disposed somewhat diagonally so as to cause the throttle to be advanced slightly when moving from neutral to either forward or reverse in order to reduce the likelihood of stalling, the pockets 34a and 35a permitting the engine speed to again be reduced if desired after engagement of the transmission has been completed.

Figure 7:
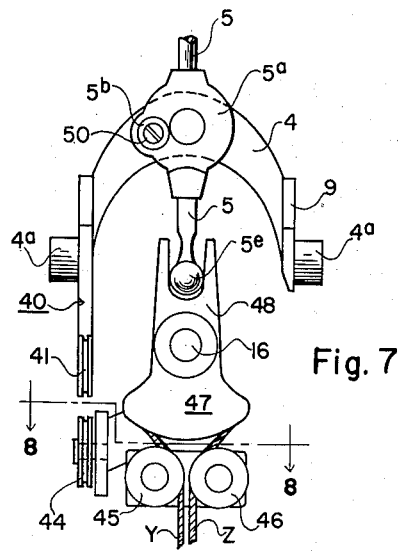
Fig. 7 is an elevation view of the modified form of the operator means shown in Fig. 6, Fig. 7 being taken at right-angles to Fig. 6.
Figure 8:
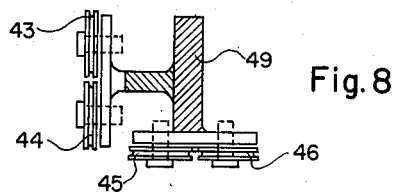
Fig. 8 is a section view taken along line 8—8 of Fig. 7.

Figs. 6, 7 and 8 show a modified form of the control means for the purpose of using tension cables as distinguished from push-pull control cables. Parts in Figs. 6, 7 and 8 which are the same as the parts shown in Figs. 1 and 2 bear the same reference characters.

In the modification shown in Figs. 6, 7 and 8, the bearing block 4 carries a divided sheave 40 having two cam portions 41 and 42 which serve the purpose of pulling a tension control cable X in one direction or the other. This sheave 40 replaces the first arm 8 in the form shown in Figs. 1 and 2, and the cable X is guided by a pair of pulleys 43 and 44 in such a way that the cable is pulled upwardly through the pulleys 43 and 44 whenever the sheave 40 is rocked in either direction away from its position as shown in Fig. 6 so as to pull the cable upwardly.

Fig. 7 shows two additional cables Y and Z which pass upwardly through two additional pulleys 45 and 46 and which rock a sheave 47 which is part of an arm 48 used in place of the arm 15 in the form shown in Figs. 1 and 2. When the ball 5e is rocked either to the right or to the left in Fig. 7, one of the cables Y and Z will be pulled in and the other one payed out around the periphery of the sheave segment 47. In the position shown in Fig. 7 the transmission will be in neutral. The guide pulleys 3, 4, 5 and 6 are mounted on brackets 49 which are located beneath the frame 1 and are attached to the support member 1e, Fig. 1, the cables X, Y and Z replacing the push-pull cable assemblies T and C, but serving a similar purpose.

The detent means shown in Figs. 1, 2, 6 and 7 comprise a small screw 50 threaded into a bore in the boss 5d and pressing against a spring 51 which in turn springloads a ball 52, which ball rides in said bore and releasably engages a socket 53 in the bearing block 4. There can be any desired number of detent positions merely by drilling additional sockets 53 into the bearing block 4, but a single position will suffice wherein the lever is centered in the crosswise slot of the cover 20 so as to indicate neutral transmission position.

Other modifications are, of course, contemplated, for instance placing of the crosswise slot at one of the longitudinal ends of the cover instead of in the center thereof, and then having the two longitudinal slots extend outwardly from the crosswise slot both in the same direction. Other modifications and changes are, of course, possible within the scope of the following claims.

I claim:

1. A head having a handle for controlling the advance of an engine throttle by angular motions of the handle about an axis disposed transversely of the head and for controlling the engagement of the engine transmission by rocking motions of the handle transversely of the head, comprising a frame; a bearing block journaled in the frame on said transverse axis; a control lever pivotally connected to said block by joint means having its axis disposed normal to said transverse axis, the lever extending outwardly of the head and carrying the handle and extending inwardly and terminating near the transverse axis at an operator end, said angular motions of the handle pivoting the bearing block about said transverse axis and said rocking motions of the handle displacing the operator end of the lever transversely of the head about said joint means; a linkage pivotally connected to the frame and having a forked inner end comprising plates disposed on opposite sides of said operator end of the lever and said linkage being pivoted by transverse motion thereof and having an outer end connected to transmission control means; and a first arm fixed to the bearing block and extending out from said axis and connected to operate throttle control means.

2. In a head as set forth in claim 1, said bearing block comprising a transverse arched member journaled at opposite sides of the frame, the lever intersecting said transverse axis in the arch of the member; and said linkage comprising a second arm pivotally supported by the frame, the plates at the inner end lying on planes normal to said transverse axis and engaging the operator end of the level closely adjacent to said transverse axis.

3. In a head as set forth in claim 2, said control means comprising a cable having a push-pull core, and said second arm comprising a bell crank rocked at said inner end by said operator end, and connected at said outer end to said core.

4. In a head as set forth in claim 2, said control means comprising two tension cables, and said second arm having transversely disposed sheave means at said outer end connected with said cables, the cables being connected to and guided by the sheave means such that one cable is fed out while the other is pulled in as the second arm is rocked.

5. In a head as set forth in claim 2, said plates lying on opposite sides of said operator end of the lever, the area of the plates being sufficient that the forked end of the linkage is always in contact with said operator end of the lever, whereby the second arm is rocked by transverse motion of the handle regardless of the angular position thereof.

6. In a head as set forth in claim 1, said bearing block comprising an arched transverse member journaled at opposite sides of the frame, said lever intersecting said transverse axis in the arch of the member; said joint means comprising a boss on the lever, a boss on the block, and a pin transfixing the bosses; and yieldable detent means between the bosses detaining the lever in at least one of the possible transverse positions of the handle.

7. In a head as set forth in claim 1, friction brake means fixed to the frame and engaging said bearing block; and brake adjustment means controlling the drag on the bearing block and thereby controlling the resistance to said angular movement of the lever handle.

8. In a head as set forth in claim 1, a cover over the frame and covering the bearing block and the lever joint means and having a slotted guide portion through which the lever extends outwardly to join the handle, the guide portion of the cover having at least one arcuate slot disposed normal to said transverse axis and substantially limiting the lever to angular motions and said guide portion having a crosswise slot guiding the lever in motions substantially transversely of the head, said handle setting the throttle to idle position in the angular vicinity of the cross-wise slot; and the handle engaging the transmission in the transverse vicinity of each arcuate slot.

9. In a head as set forth in claim 8, said joint means comprising a boss on the lever; a boss on the block; a pin transfixing the bosses; and detent means between the bosses yieldably detaining the lever at a neutral transmission position in the crosswise slot.

10. In a head as set forth in claim 8, the transmission being in neutral position when the lever is in the crosswise slot away from any arcuate slot, and said guide portion having an auxiliary arcuate slot intersecting the crosswise slot at said neutral position of the lever, whereby the throttle can be advanced when the transmission is in neutral.

11. In a head as set forth in claim 10, lock means on said guide portion at said auxiliary slot and releasably blocking entry of the lever thereinto.

12. In a head as set forth in claim 8, the arcuate slots being of such width as to closely fit the lever, but the width of the cross-wise slot being larger than the lever so that a limited amount of throttle advancing motion can be made while the lever is in the cross-wise slot.

13. In a head as set forth in claim 12, slidable stop means adjacent longitudinal edges of the cross-wise slot such that adjustment of the separation of the stop means adjusts the amount of throttle motion which can be made while the lever is in the cross-wise slot; and means for locking said stop means to said guide portion in adjusted position.

14. A head having a handle for controlling the advance of an engine throttle by angular motions of the handle about an axis disposed transversely of the head and for controlling the engagement of the engine transmission by rocking motions of the handle transversely of the head, comprising a frame; a bearing block journaled in the frame on said transverse axis; a control lever pivotally connected to said block by joint means having its axis disposed normal to said transverse axis, the lever extending outwardly of the head and carrying the handle and extending inwardly and terminating near the transverse axis at an operator end, said angular motions of the handle pivoting the bearing block about said transverse axis and said rocking motions of the handle displacing the operator end of the lever transversely of the head about said joint means; a cover over the frame and covering the bearing block and the lever joint means and having a slotted guide portion through which the lever extends outwardly to join the handle, the guide portion of the cover having a cross-wise slot limiting the lever to transmission-controlling motions substantially transversely of the head, and the guide portion having at least two transversely spaced arcuate slots disposed normal to said transverse axis and respectively connecting with the cross-wise slot at the transverse ends of the latter, and the arcuate slots limiting the lever to angular throttle controlling motions; linkage means engaging the operator end of the lever and moved by transverse motion thereof, said linkage means being connected to transmission control means; and a first arm fixed to the bearing block and extending out from said axis and connected to operate throttle control means.

15. In a head as set forth in claim 14, the location of said cross-wise slot being at a position on said guide portion where the throttle is retarded, and the throttle being advanced by moving the lever away from the cross-wise slot in one of said arcuate slots.

16. In a head as set forth in claim 15, the transmission being in neutral position when the lever is in the cross-wise slot away from any arcuate slot, and said guide portion having an auxiliary arcuate slot intersecting the cross-wise slot at said neutral position of the lever, whereby the throttle can be advanced when the transmission is in neutral.

17. In a head as set forth in claim 15, the cross-wise slot being in the longitudinal center of the head, and said arcuate slots extending in opposite directions from the cross-wise slot, the transmission being in neutral in the center of the cross-wise slot and being respectively in forward and reverse in the respective arcuate slots.

18. In a head as set forth in claim 17, the cross-wise slot being disposed diagonally across the guide portion and passing through its center so that the throttle is slightly advanced as the transmission is engaged by moving the handle transversely off of center.

19. In a head as set forth in claim 18, said arcuate slots extending short distances in opposite directions beyond said cross-wise slot to form lever receiving pockets wherein the lever engages the transmission but the throttle is in its lowest idle position.

References Cited in the file of this patent

UNITED STATES PATENTS

| | | |
|---|---|---|
| 2,420,856 | Brill et al. | May 20, 1947 |
| 2,463,181 | Kaiser | Mar. 1, 1949 |
| 2,554,313 | Price | May 22, 1951 |
| 2,588,650 | Morse | Mar. 11, 1952 |

FOREIGN PATENTS

| | | |
|---|---|---|
| 13,763 | Germany Sch II/63c | Jan. 26, 1956 |
| 181,412 | Switzerland | Mar. 2, 1936 |
| 744,656 | France | Jan. 26, 1933 |